United States Patent
Lawlor

(10) Patent No.: US 9,931,704 B2
(45) Date of Patent: Apr. 3, 2018

(54) LINE-OF-SIGHT BLOWER FOR A POWER TOOL

(71) Applicant: Nanjing Chevron Industry Co., Ltd., Nanjing (CN)

(72) Inventor: Michael J. Lawlor, Chicago, IL (US)

(73) Assignee: Nanjing Chevron Industry Co., Ltd., Nanjing (CN)

( * ) Notice: Subject to any disclaimer, the term of this patent is extended or adjusted under 35 U.S.C. 154(b) by 619 days.

(21) Appl. No.: 14/268,320

(22) Filed: May 2, 2014

(65) Prior Publication Data
US 2014/0325853 A1    Nov. 6, 2014

Related U.S. Application Data

(60) Provisional application No. 61/819,999, filed on May 6, 2013.

(51) Int. Cl.
*B23D 59/00* (2006.01)
*B23Q 11/00* (2006.01)

(52) U.S. Cl.
CPC .......... *B23D 59/006* (2013.01); *B23Q 11/005* (2013.01)

(58) Field of Classification Search
CPC ............................ B23D 59/006; B23Q 11/005
USPC ....... 30/123, 123.3, 370–377, 388–394, 516; D8/70
See application file for complete search history.

(56) References Cited

U.S. PATENT DOCUMENTS

| | | | | |
|---|---|---|---|---|
| 2,794,459 A | * | 6/1957 | Hosford et al. | B23D 51/14 30/516 |
| 3,033,252 A | * | 5/1962 | Atkinson | B23D 59/006 30/392 |
| 4,195,403 A | * | 4/1980 | Gruber | B23D 59/006 30/123.3 |
| 4,730,397 A | * | 3/1988 | Weiford | B23D 49/167 30/392 |
| 4,778,315 A | * | 10/1988 | Duffy | B23Q 11/005 29/DIG. 78 |
| 4,782,591 A | * | 11/1988 | DeVito | B24B 55/02 30/123.3 |

(Continued)

FOREIGN PATENT DOCUMENTS

DE   3717585 A1 * 12/1988
DE   10226877 A1 * 12/2003

(Continued)

*Primary Examiner* — Jason Daniel Prone
(74) *Attorney, Agent, or Firm* — Greenberg Traurig, LLP

(57) ABSTRACT

A power tool has a cutting element driven by a motor assembly, the motor assembly driving a fan for flowing air over the motor assembly. The power tool includes a foot plate configured to be supported on a workpiece, the foot plate defining an opening through which the cutting element extends, and at least one alignment opening arranged relative to the cutting element opening to allow the operator to visualize the cut line of the cut created by the cutting element. A motor housing is provided that supports the motor assembly on the foot plate, in which the motor housing defines a cavity substantially enclosing the motor assembly and arranged to receive airflow from the fan. A nozzle is defined in the motor housing that is configured to direct airflow from the cavity of the motor housing in an airflow line of action intersecting the at least one alignment opening.

17 Claims, 3 Drawing Sheets

(56) References Cited

U.S. PATENT DOCUMENTS

| | | | | |
|---|---|---|---|---|
| 4,870,755 | A * | 10/1989 | Schnizler | B23D 59/006 30/123.3 |
| 4,876,797 | A * | 10/1989 | Zapata | B23D 47/005 30/388 |
| 5,046,255 | A * | 9/1991 | Lebreux | B23D 59/006 30/390 |
| 5,084,971 | A * | 2/1992 | Remington | B23D 59/006 30/123 |
| 5,199,174 | A * | 4/1993 | Wild | B23D 59/006 30/123.3 |
| 5,403,318 | A * | 4/1995 | Boehringer | A61B 17/14 606/178 |
| 5,539,985 | A * | 7/1996 | Wershe | B23D 47/005 30/123.3 |
| 5,689,884 | A * | 11/1997 | Wershe | B23D 47/005 30/123.3 |
| 6,173,499 | B1 * | 1/2001 | Hegoas | B23D 59/006 30/123.3 |
| 6,301,789 | B1 * | 10/2001 | Zeiler | B23D 59/001 30/374 |
| 6,772,664 | B2 * | 8/2004 | Chiang | B08B 15/04 83/100 |
| 6,892,459 | B2 * | 5/2005 | Okumura | B23D 59/006 30/123.3 |
| 6,981,779 | B2 * | 1/2006 | Fukuoka | B23D 59/00 83/13 |
| 6,996,874 | B2 * | 2/2006 | Liu | B23Q 11/005 30/388 |
| 7,103,979 | B2 * | 9/2006 | Yoshida | B23D 59/006 30/388 |
| 7,219,435 | B2 * | 5/2007 | Yoshida | B23D 59/006 30/388 |
| 7,275,326 | B2 * | 10/2007 | Tanimoto | B23Q 17/2404 30/123.3 |
| 7,412,961 | B2 * | 8/2008 | Doring | B27B 17/00 30/381 |
| 7,475,482 | B2 * | 1/2009 | Bocka | B23D 59/006 30/123.3 |
| 8,037,614 | B2 * | 10/2011 | Yang | B23D 59/006 30/388 |
| 8,272,304 | B2 * | 9/2012 | Lawlor | B23D 45/044 83/100 |
| D694,082 | S * | 11/2013 | Wrobel | D8/70 |
| 8,931,178 | B2 * | 1/2015 | Beam | B26B 19/3813 30/123 |
| 8,935,857 | B2 * | 1/2015 | Inayoshi | B23D 45/16 30/388 |
| D735,546 | S * | 8/2015 | Bermudez | D8/70 |
| D735,547 | S * | 8/2015 | Bermudez | D8/70 |
| D735,548 | S * | 8/2015 | Bermudez | D8/70 |
| 2004/0112191 | A1 * | 6/2004 | Whiffen | B23Q 11/0046 83/98 |
| 2005/0204563 | A1 * | 9/2005 | Stender | B25F 5/00 30/123 |
| 2008/0282557 | A1 * | 11/2008 | Kaiser | B23D 59/04 30/392 |
| 2011/0214302 | A1 * | 9/2011 | Inayoshi | B25F 5/02 30/371 |
| 2012/0198708 | A1 * | 8/2012 | Naito | B27B 9/00 30/371 |
| 2014/0366383 | A1 * | 12/2014 | Dyer | B23Q 11/127 30/123 |

FOREIGN PATENT DOCUMENTS

| | | | |
|---|---|---|---|
| GB | 2075421 A | * | 11/1981 |
| GB | 2462365 A | * | 2/2010 |
| WO | WO 2009031710 A1 | * | 3/2009 |

* cited by examiner

LINE-OF-SIGHT BLOWER FOR A POWER TOOL

REFERENCE TO RELATED APPLICATION AND PRIORITY CLAIM

This is a non-provisional application of and claims priority to co-pending Provisional Application No. 61/819,999, filed on May 6, 2013, the disclosure of which is incorporated herein in its entirety.

BACKGROUND

This disclosure relates to power tools and particularly to devices for dispersing dust and debris from the working path of the tool.

Power tools such as circular saws, table saws, miter saws, or the like produce dust and debris as the workpiece material is cut, and in many cases the tools are used in an inherently dusty environment, such as at a construction site or in a fabrication facility. It is a common practice to mark a cut line on the workpiece as a guide for the path of the power tool. Most tools have some form of alignment feature that allows the operator to align the cutting element of the power tool with the cut line. For example, a circular saw, such as the saw 10 shown in FIGS. 1 and 2, may include a shoe plate 11 with an opening 14 through which the working tool, or saw blade, extends, and an alignment window 15 in the body of the plate. The alignment window 15 may incorporate alignment prongs 16 to allow the operator to see the line of action of the working tool, or cut line, through the window. The shoe plate may also include a notch 18 defined at the leading edge of the plate that can also be used to indicate the cut line and ensure proper alignment of the power tool cutting element, such as the blade assembly 12.

During a cut operation dust and debris frequently settles on the workpiece forward of the cutting blade, and more particularly on the leading end of the shoe plate 11. The dust can thus obscure either or both of the alignment components 15 and 18, making it hard to see the cut line as well as the alignment components. The dust can thus compromise the operator's ability to accurately follow the cut line, or at a minimum can require the operator to stop and blow the debris away from the cutting path.

Some power tools are provided with a separate blower directed at the cutting path to remove the dust and debris, but such separate blowers are often bulky. Other power tools utilize air flow from a cooling fan driven by the power tool motor. For instance, in the tool 10 shown in FIGS. 1-2, a motor housing 20 contains a motor M (FIGS. 3, 5) coupled to the blade assembly 12. The housing 20 substantially encloses the motor while defining a cavity 21 (FIG. 5) around the motor M for cooling air flow. The motor drives a fan in a fan housing 22 that draws ambient air into the motor housing 20 through inlet openings, such as openings 24 in the side of the fan housing and/or openings 25 in the lateral face of the housing. The fan is operable to draw the ambient air through the cavity and over the motor to cool the motor. Certain power tools provide an outlet opening in the motor housing that is directed toward the leading end of the shoe plate. The outlet opening in these power tools is generally aimed toward either the interface between the cutting element and the workpiece or toward the alignment features of the shoe plate. Other tools direct the airflow passing over the motor to the shroud 13 of the blade assembly 12 to roughly follow the rotational path of the cutting blade toward the workpiece.

While some prior power tools offer some form of debris blower that is integrated into the existing tool, they all suffer from the same limitations, such as limited air flow specifically directed to the alignment features or an air flow path that is too narrow to provide clearance to the cutting path and alignment features. Consequently, there is a need for a blower that can be integrated into the power tool and that is configured to provide clearance to the cutting path so that the operator can clearly visualize the cut line and the alignment features of the tool.

SUMMARY

In accordance with one aspect of the disclosure, a power tool has a cutting element driven by a motor assembly for performing a cut on a workpiece, the motor assembly further driving a fan for flowing air over the motor assembly. The power tool further includes a foot plate configured to be supported on a workpiece, the foot plate defining an opening through which the cutting element extends to perform the cut, and at least one alignment opening arranged relative to the cutting element opening to allow the operator to visualize the cut line of the cut created by the cutting element therethrough. A motor housing is provided that supports the motor assembly on the foot plate, in which the motor housing defines a cavity substantially enclosing the motor assembly and arranged to receive airflow from the fan. In one aspect of the disclosure, a nozzle is defined in the motor housing that is configured to direct airflow from the cavity of the motor housing in an airflow line of action intersecting the at least one alignment opening. The power tool can be, for example, a circular saw, a table saw, a miter saw, a compound saw, an oscillating saw, or the like.

In one feature, the nozzle includes an inlet opening at the cavity and an outlet opening through which the airflow is discharged, in which the inlet opening has a flow area greater than the flow area of the outlet opening. In a further feature, the power tool is provided with a duct arrangement disposed around the circumference of the motor housing and having an outlet aligned with the nozzle and an inlet circumferentially offset from the outlet for receiving airflow from within the motor housing. The inlet of the duct arrangement is configured and arranged to receive airflow discharged from the motor assembly and to receive ambient air drawn into the motor housing.

DETAILED DESCRIPTION

Figure 1:
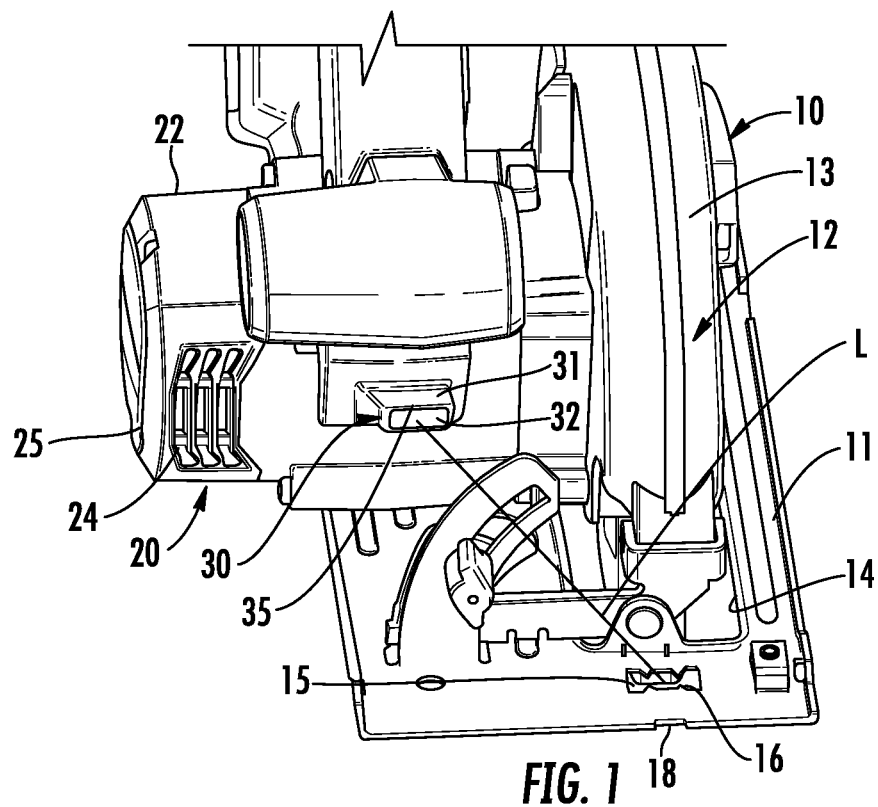
FIG. 1 is a front perspective view of the leading end of a power tool incorporating a blower according to one aspect of the disclosure.
Figure 2:
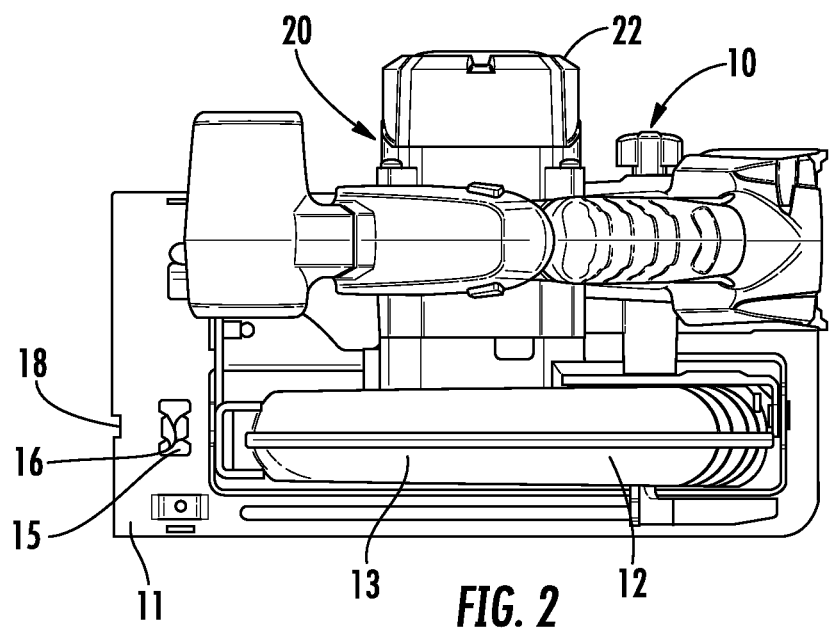
FIG. 2 is a top view of the power tool shown in FIG. 1.

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure encompasses any alterations and modifications to the illustrated embodiments and includes further applications of the principles of the disclosure as would normally occur to one skilled in the art to which this disclosure pertains.

In one aspect of the disclosure, the motor housing 20 is provided with an outlet nozzle 30 that is configured to direct an airflow directly toward the alignment features 15, 18. As shown in FIGS. 1 and 4-6, the outlet nozzle 30 is defined by a perimeter wall 31 projecting outward from the motor housing 20. The perimeter wall defines a generally rectangular-shaped outlet opening 32, with the wall configured to direct the airflow downward and inward relative to the outlet opening. The rectangularly shaped nozzle is configured so that the long dimension of the rectangular shape extends generally horizontally relative to the foot plate. The generally rectangular configuration of the outlet opening can provide a wide airflow swath across the alignment feature, which provides the benefit of dispersing all dust and debris in the vicinity of the alignment features. Although a rectangular-shaped outlet opening 32 is illustrated, an opening with other forms or geometric shapes is possible. The outlet nozzle 30 is positioned laterally offset from the alignment features, as shown in FIG. 1, and is angled inward toward the alignment features along an airflow line of action L. The airflow line of action L has a vertical component downward toward the alignment features and a lateral component across the features. The downward component tends to dislodge the dust and debris from the workpiece surface, while the lateral component tends to blow the dust and debris laterally away from the tool 10 and away from the line of sight of the operator.

In one aspect, the line of action L of the airflow discharged from the nozzle 30 intersects the cut line created by the saw blade assembly 12 at the alignment features 16, 18. Thus, regardless of the orientation of the saw blade relative to the foot plate 11, the airflow from the nozzle 30 will always be directed at the alignment features to clear dust and debris that might otherwise obscure the cut line.

The outlet nozzle 30 may further include an inner baffle 35 that helps focus the airflow and reduce turbulence as the air exits the outlet nozzle 30. The baffle 35 may be horizontally aligned relative to the foot plate to divide the airflow into an upper component and a lower component, with both airflow components directed along the airflow line of action L. In one embodiment, the perimeter wall 31 may define the outlet opening 32 to have a width of about 1-2 inches and a height of about ½-1 inches, although other dimensions may be appropriate for other types of power tools. The outlet opening 32 is preferably dimensioned so that airflow discharged from the motor housing 20 is not so diffuse as to be ineffective at removing dust and debris from the leading end of the foot plate 11 and from the alignment features 15, 18.

Figure 3:
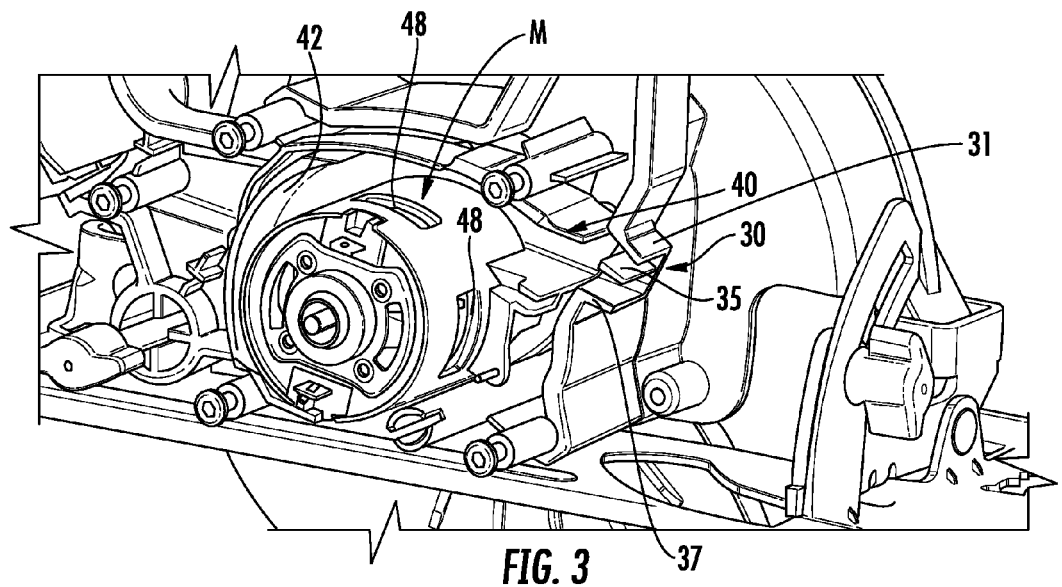
FIG. 3 is a side perspective cut-away view of the motor portion of the power tool of FIG. 1.
Figure 4:
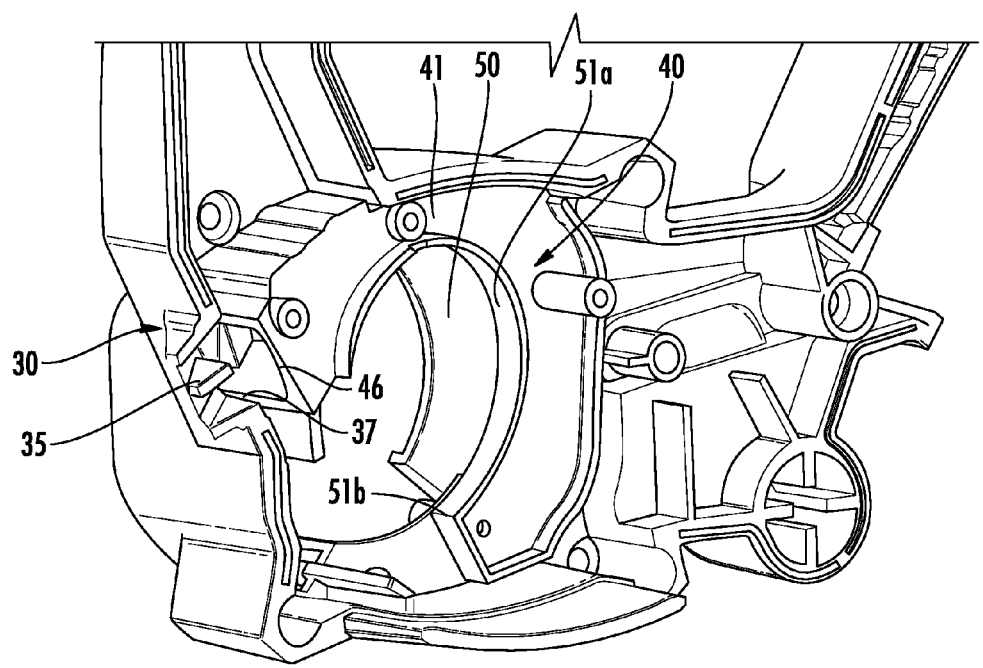
FIG. 4 is a perspective cutaway view of the motor housing of the motor portion of FIG. 3.

The opening 32 is preferably dimensioned to form a nozzle that can accelerate and focus airflow from within the motor housing. Thus, as shown in FIGS. 3-4, the outlet nozzle 30 has an inlet opening 37 that has a larger area than the outlet opening 31. As is known, airflow velocity increases as the area of the nozzle decreases. Thus, the outlet nozzle 30 is configured to accelerate the airflow discharged from the motor housing.

In order to collect airflow and direct it to the outlet nozzle 30, a duct arrangement 40 is provided within the motor housing 20, as best shown in FIGS. 3-6. The duct arrangement 40 includes a housing 41 that is configured to at least partially encircle the motor assembly M. The housing 41 defines a circumferential channel 42 that extends from an inlet 45 near the bottom of the motor housing 20 (see FIGS. 4, 6) to an outlet 46 that is aligned with the inlet opening 37 of the outlet nozzle 30 (see FIG. 4). The area of the outlet 46 of the duct channel 42 is generally equal to the area of the inlet opening 37 to promote a uniform non-turbulent airflow through the channel. A duct wall 50, a partially circumferential wall 51a (FIG. 4) and an end wall 51b enclose the channel 42 and define the inlet opening 45. In one embodiment, the duct arrangement 40 is a stand-alone component that can be mounted within the cavity 21 of the motor housing 20 around the motor assembly M, as best seen in FIG. 4. In this embodiment, the duct arrangement may be formed of a plastic, such as a low strength plastic since the duct arrangement is not a load bearing component. In another embodiment, the housing 41 may be integrated into the motor housing 20 and the features 42, 45, and 46 may be formed as part of the motor housing 20.

Figure 5:
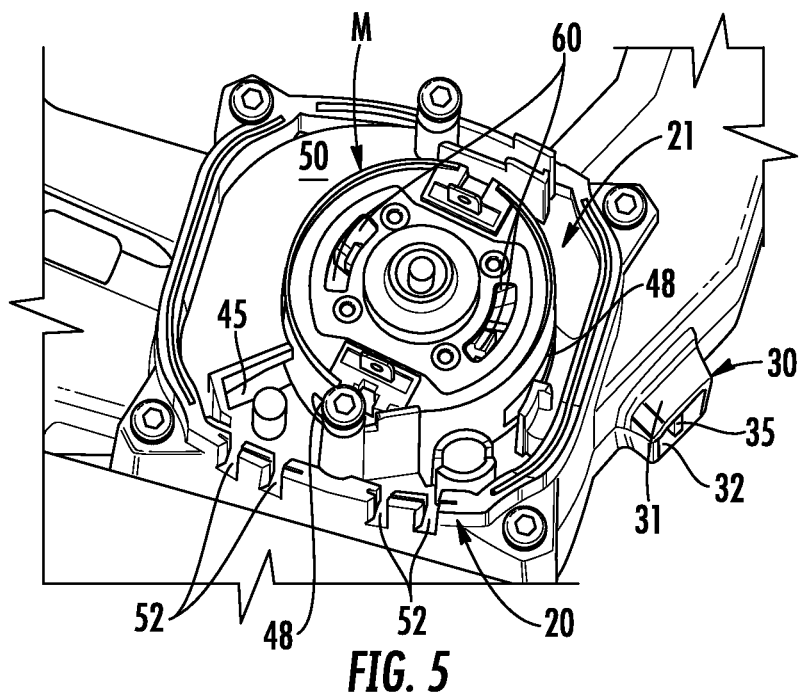
FIG. 5 is an enlarged perspective cut-away view of the motor housing shown in FIG. 4.
Figure 6:
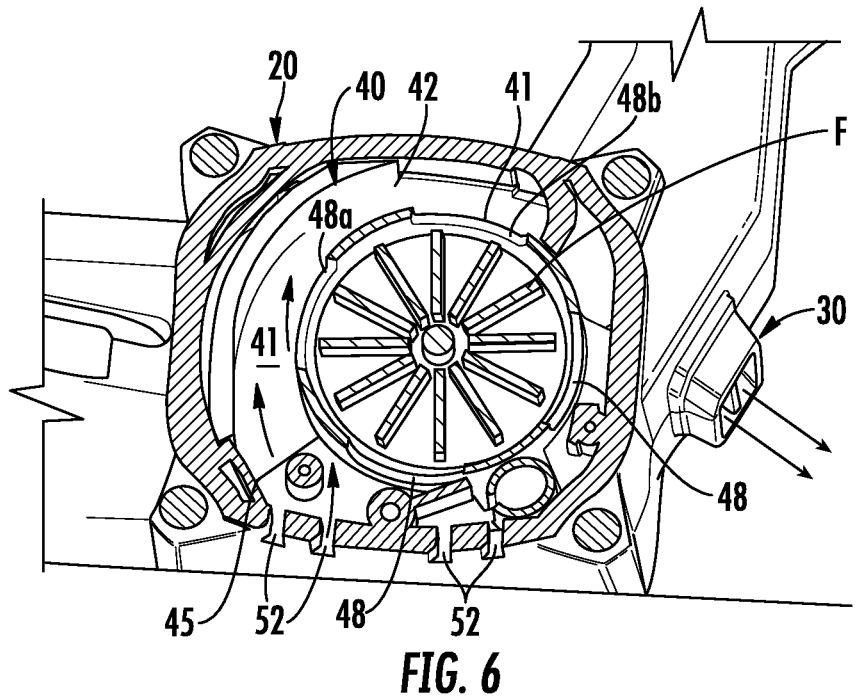
FIG. 6 is an enlarged perspective cut-away view of the motor housing shown in FIG. 4 showing the air flow through the housing.

The duct arrangement 40 is fed by airflow from two sources. The first source is the motor assembly itself, and particularly airflow generated by the fan F driven by the motor (FIG. 6). As is known, the fan F draws air into the fan housing 22 through openings 24, 25 (FIG. 1). This air is directed by the fan through openings 60 (FIG. 5) and over the motor to cool the motor. The airflow directed across the motor exits the motor assembly M through slots 48 defined between the motor assembly M to enter the channel 42 of the duct arrangement 40 (FIGS. 3, 6). The motor assembly may include a plurality of slots 48 circumferentially spaced around the assembly, such as the four slots 48, 48a, 48b shown in FIG. 6. As shown in FIG. 5, the duct wall 50 may be arranged to separate at least one of the slots of the motor assembly, such as slots 48a, 48b (FIG. 6), from the cavity 21 within the motor housing 20. The exhaust airflow exiting the motor assembly thus generates an airflow in the channel 42 that is directed to the outlet 46 of the duct arrangement and the inlet 37 of the outlet nozzle 30.

The second source of air is through openings 52 defined in the bottom of the motor housing 20, as best seen in FIGS. 5-6. Ambient air is drawn through openings 52 into the channel 42 by the venturi effect of the motor fan driven airflow. In other words, the circulating airflow generated by the fan F produces a reduced pressure at the duct inlet 45 that draws additional ambient air into the duct arrangement 40. This ambient air mingles with the exhaust airflow from the fan F to increase the airflow volume discharged from the outlet nozzle 30. The additional ambient air also provides the minor benefit of cooling the airflow discharged from the motor assembly.

In the illustrated embodiment, a single outlet nozzle 30 is provided. However, it is contemplated that more than one such outlet nozzle may be integrated into the motor housing 20. In the illustrated embodiment, the duct arrangement 40 does not completely encircle the motor assembly and is not shown in communication with all of the openings 48. However, it is contemplated that the duct arrangement may be configured to completely encircle the motor assembly and be in communication with all of the openings to receive all of the cooling airflow discharged from the motor assembly. This modified duct arrangement would retain the outlet 46 and may incorporate a baffle within the channel 42 to ensure that substantially all of the circulating airflow exits the duct arrangement through the duct outlet 46.

The disclosure contemplates a line-of-sight blower for a power tool that redirects cooling airflow discharged from the motor assembly toward the cutting direction of the power tool. More particularly, the disclosure contemplates a nozzle that is arranged to point toward the leading end of a foot plate of the tool and/or toward alignment features of the tool. The line-of-sight augments the motor cooling airflow with additional ambient air drawn into a duct arrangement by circulating airflow produced by the motor cooling airflow. The nozzle is configured to provide a wide but directed airflow across the alignment features that is sufficient to keep the alignment features clear of dust and debris during a cutting operation. The blower nozzle is further oriented so that the airflow across the alignment features has a lateral component to blow dust and debris laterally away from the line of sight of the tool operator.

The present disclosure should be considered as illustrative and not restrictive in character. It is understood that only certain embodiments have been presented and that all changes, modifications and further applications that come within the spirit of the disclosure are desired to be protected.

What is claimed is:

1. A power tool having a cutting element driven by a motor assembly for performing a cut on a workpiece, the motor assembly further driving a fan for flowing air over the motor assembly, the power tool comprising:
    a foot plate configured to be supported on a workpiece, the foot plate defining an opening through which the cutting element extends to perform the cut, and at least one alignment opening arranged relative to the cutting element to allow an operator operating the power tool to visualize a cut line of the cut created by the cutting element in the workpiece;
    a motor housing supporting the motor assembly on the foot plate, the motor housing defining a cavity substantially enclosing the motor assembly and arranged to receive the flowing air from the fan;
    a nozzle defined in the motor housing configured to direct the flowing air from the cavity of the motor housing via the fan in an airflow line of action intersecting the at least one alignment opening; and
    a duct arrangement disposed in the cavity and at least partially around a circumference of the motor housing, the duct having an outlet aligned with the nozzle and an inlet circumferentially offset from the outlet for receiving the flowing air from within the motor housing.

2. The power tool of claim 1, wherein the nozzle includes an inlet opening at the cavity and an outlet opening through which the flowing air is discharged, the inlet opening having a flow area greater than the flow area of the outlet opening.

3. The power tool of claim 1, wherein the nozzle is rectangular in shape.

4. The power tool of claim 1, wherein the nozzle includes a baffle separating the flowing air through the nozzle into two components.

5. The power tool of claim 4, wherein the baffle is arranged generally horizontal relative to the foot plate.

6. The power tool of claim 1, in which the motor assembly includes at least one inlet opening for receiving the flowing air from the fan and at least one outlet slot for discharging the flowing air from the motor assembly, wherein the inlet of the duct arrangement is arranged to receive the flowing air discharged through the at least one outlet slot of the motor assembly.

7. The power tool of claim 6, in which the at least one outlet slot of the motor assembly includes a plurality of outlet slots spaced circumferentially apart, wherein the duct arrangement includes a duct wall arranged to separate the flowing air discharged through at least one of the plurality of outlet slots.

8. The power tool of claim 1, in which the motor housing includes at least one opening to draw ambient air into the cavity, wherein the inlet of the duct arrangement is arranged to receive the ambient air drawn into the cavity through the at least one opening in the motor housing.

9. The power tool of claim 1, wherein the duct arrangement is a self-contained unit mountable within the cavity of the motor housing around the motor assembly.

10. The power tool of claim 1, in which the cutting element defines a line of action along with the cut is made, wherein the nozzle is configured so that the flowing air directed along the line of action from the nozzle intersects the line of action of the cutting element at the at least one alignment opening.

11. A power tool having a cutting element driven by a motor assembly for performing a cut on a workpiece, the motor assembly further driving a fan for flowing air over the motor assembly, the power tool comprising:
    a foot plate configured to be supported on a workpiece, the foot plate defining an opening through which the cutting element extends to perform the cut, and at least one alignment opening arranged relative to the cutting element, defining a line of action;
    a motor housing supporting the motor assembly on the foot plate, the motor housing defining a cavity substantially enclosing the motor assembly and arranged to receive the flowing air from the fan;
    a nozzle defined in the motor housing configured to direct the flowing air from the cavity of the motor housing via the fan in an airflow line of action intersecting the at least one alignment opening; and
    a duct arrangement disposed in the cavity and at least partially around a circumference of the motor housing and having an outlet aligned with the nozzle and an inlet circumferentially offset from said outlet for receiving the flowing air from within the motor housing,
    wherein the airflow line of action from the nozzle intersects the line of action of the cutting element at the at least one alignment opening.

12. The power tool of claim 11, wherein the nozzle includes an inlet opening at the cavity and an outlet opening through which the flowing air is discharged, the inlet opening having a flow area greater than the flow area of the outlet opening.

13. The power tool of claim 12, wherein the nozzle further includes a baffle separating the flowing air through the nozzle into two components.

14. The power tool of claim 11, in which the motor assembly includes at least one inlet opening for receiving the flowing air from the fan and at least one outlet slot for discharging the flowing air from the motor assembly, wherein the inlet of the duct arrangement is arranged to receive the flowing air discharged through the at least one outlet slot of the motor assembly.

15. The power tool of claim 14, in which the at least one outlet slot of the motor assembly includes a plurality of outlet slots spaced circumferentially apart, wherein the duct arrangement includes a duct wall arranged to separate the flowing air discharged through at least one of the plurality of outlet slots.

16. The power tool of claim 11, in which the motor housing includes at least one opening to draw ambient air into the cavity, wherein the inlet of the duct arrangement is arranged to receive the ambient air drawn into the cavity through the at least one opening in the motor housing.

17. The power tool of claim 11, wherein the duct arrangement is a self-contained unit mountable within the cavity of the motor housing around the motor assembly.

* * * * *

UNITED STATES PATENT AND TRADEMARK OFFICE
CERTIFICATE OF CORRECTION

PATENT NO. : 9,931,704 B2  
APPLICATION NO. : 14/268320  
DATED : April 3, 2018  
INVENTOR(S) : Michael J. Lawlor Page 1 of 1

It is certified that error appears in the above-identified patent and that said Letters Patent is hereby corrected as shown below:

On the Title Page

(73) Assignee: Nanjing 'Chevron' Industry Co., Ltd. should read Nanjing --Chervon-- Industry Co., Ltd.

Signed and Sealed this  
Sixth Day of November, 2018

Andrei Iancu  
*Director of the United States Patent and Trademark Office*